United States Patent [19]

Schiller

[11] 3,874,688

[45] Apr. 1, 1975

[54] COLLET ADAPTER

[76] Inventor: Norman E. Schiller, 135 Eucalyplus Dr., El Segundo, Calif. 90245

[22] Filed: Apr. 4, 1974

[21] Appl. No.: 457,896

[52] U.S. Cl. ............................. 279/50, 279/1 F
[51] Int. Cl. ................................. B23b 31/20
[58] Field of Search ............ 279/50, 51, 46, 43, 41, 279/57, 1 F

[56] References Cited
UNITED STATES PATENTS

| | | | |
|---|---|---|---|
| 1,320,113 | 10/1919 | Bemis | 279/49 |
| 2,375,115 | 5/1945 | Kylin | 279/1 F |
| 2,773,693 | 12/1966 | Chittenden | 279/48 |
| 2,856,192 | 10/1958 | Schuster et al. | 279/50 |
| 2,994,538 | 8/1961 | Farnsworth | 279/50 |

Primary Examiner—Gil Weidenfeld
Attorney, Agent, or Firm—George J. Netter, Esq.

[57] ABSTRACT

A tension tube which extends through the machine tool spindle is threaded onto the inner end of a workpiece collet received within the machine master collet jaws. The other end of the tension tube extends outwardly from the rear end of the spindle and includes a lock nut threaded thereon, which abuts against a fixed surface of the machine, preventing axial movement of the workpiece during chucking. Optionally, a spacer may be provided between the lock nut and the rear end of the machine spindle in order to provide a secure positioning of the collet with respect to the end of the machine.

6 Claims, 6 Drawing Figures

COLLET ADAPTER

The present invention relates generally to collets used in engine lathes, turret lathes, screw machines, milling machines and other machine tools, and, more particularly, to an adapter enabling use of a range of different sized collets in a turret lathe.

BACKGROUND OF THE INVENTION

In the use of many types of production machines such as turret lathes, lathes, screw machines and the like, a fundamental operation is the securing of the workpiece while it is being shaped, formed, drilled, chamfered, or otherwise operated upon. More particularly, in so treating a workpiece it must be secured tightly and positioned accurately, whether fixedly located or rotating, in order that all operations can be accomplished within acceptable tolerances.

A typical general purpose turret lathe, for example, has a rotatively powered spindle including a master collet which is selectively adjustable to bring a tapered surface on contractable springlike jaws into clamping engagement about the workpiece. The master collect is an integral part of the machine collet assembly and can only accommodate workpieces within a predetermined range of dimensions and shapes. There exist on the market a number of internal, external and extra capacity collets for accommodating workpieces of great variety specifically designed for use in engine lathes, or when mounted in a special fixture may fixedly secure a workpiece for treating in a milling machine. For example, there is a set of collets known as "5-C" collets available off-the-shelf and particularly designed for use in an engine lathe. These 5-C collets, irrespective of kind and size, all have the same external dimensions and are acceptable in the same collet closing device or a specially designed spindle. That is, typically, such a collet includes a cylindrical shank with threaded end of fixed dimensions and thread characteristics while at its other end the head is varied according to workpiece size and function (e.g., internal or external).

Use of these off-the-shelf collets has in the past been restricted to either (1) machines having specially designed spindles to incorporate the collets therein, or (2) certain other machines having the ability to accept a limited number of these collets within the machine collet closing device. Moreover, even when used with specially designed spindles and closing devices, an undesirable axial translation is produced of the collets and included workpiece during emplacement of the workpiece.

OBJECTS AND SUMMARY OF THE INVENTION

It is, accordingly, a primary aim and object of this invention to provide collet adapter apparatus enabling the utilization of workpiece collets of various acceptance sizes and characteristics for being received within the master collet of a turret lathe.

A further object is the provision of collet adapter apparatus in which expansion and contraction of a spring jaw master collet about an included workpiece collet is obtained without axially disturbing the workpiece collet and workpiece.

Another object is the provision of collet adapter apparatus for use in a general purpose machine tool, enabling utilization of collets for holding a range of different workpiece sizes without requiring change of the machine tool closure apparatus.

In accordance with the practice of the present invention, there is provided a tension tube which extends through the machine spindle and is threaded onto the inner end of the workpiece collet received within the machine master collet. The other end of the tension tube extends outwardly from the rear end of the spindle and includes a lock nut threaded thereon, which abuts against a fixed surface of the machine. Optionally, a spacer may be provided between the lock nut and the rear end of the machine spindle in order to provide a secure positioning of the collet with respect to the end of the machine. In operation, movement of the collet push tube in the direction to close the master collet forces it against tapering walls of the spindle nose, thereby closing it about the workpiece collet with axial movement of the workpiece and collet being prevented by the positive positioning of the tension tube.

DESCRIPTION OF A PREFERRED EMBODIMENT

Figure 1:
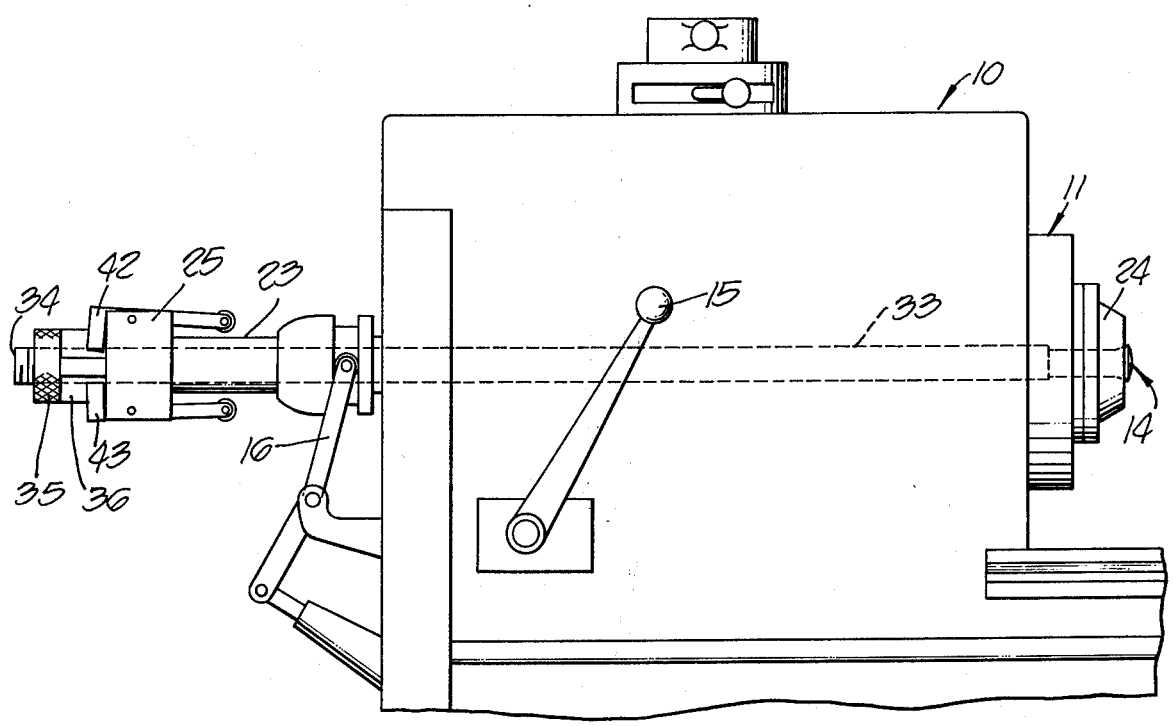
FIG. 1 is a schematic view of a typical general purpose turret lathe having rotatable chucking means in which the adapter of this invention achieves its primary utility.
Figure 2:
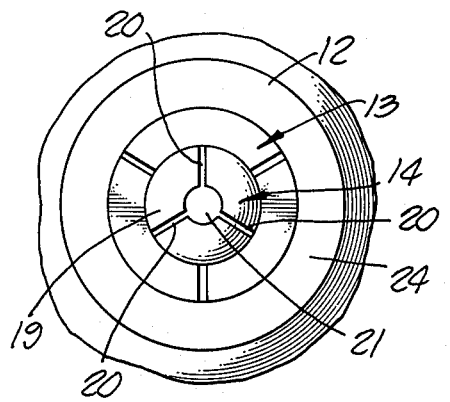
FIG. 2 is an end elevational view of the chucking means showing the workpiece collet and master machine collet in assembled relation.

Turning now to the drawings, and particularly to FIGS. 1 and 2, that part of a machine 10 in which the adapter apparatus has its primary utility is depicted. More particulary, the machine 10 may include a turret lathe, screw machine, or the like, having a means 11 within which a workpiece is secured, and by which it is rotated during shaping or otherwise being treated. In its major aspects, the means 11 includes a rotatable spindle 12 driven by a suitable power source (not shown) and a so-called chuck for holding the workpiece, which, in the form we are especially concerned with here, comprises a master collet 13 and a workpiece collet 14.

In a way that will be more particularly described later herein, movement of the lever arm 15, operating through linkage 16, moves a push tube relative to the master collet, closing it about the workpiece collet to secure the workpiece for rotation with the spindle.

Figure 3:
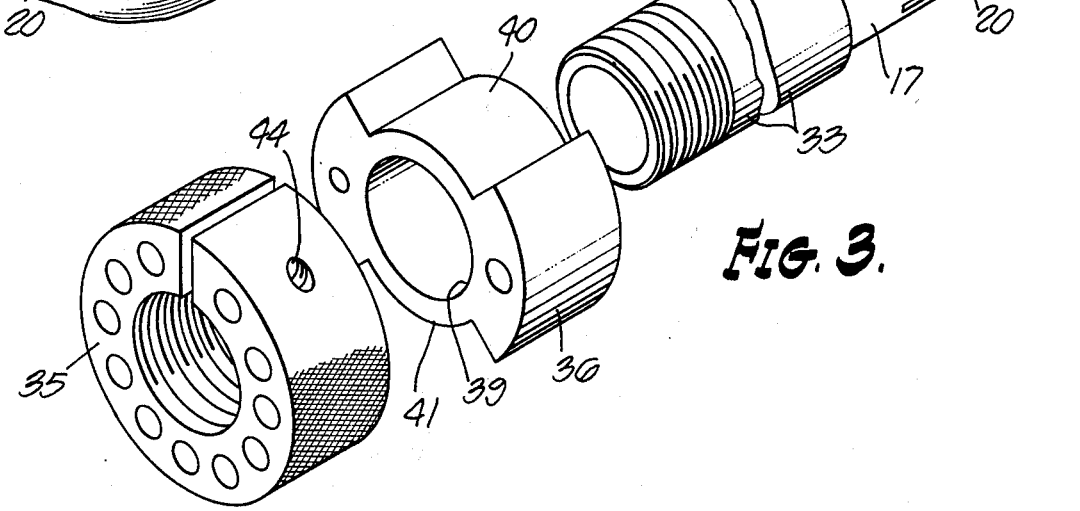
FIG. 3 is an exploded, partially fragmentary view of the collet adapter of this invention, shown assembled onto a workpiece collet.
Figure 4:
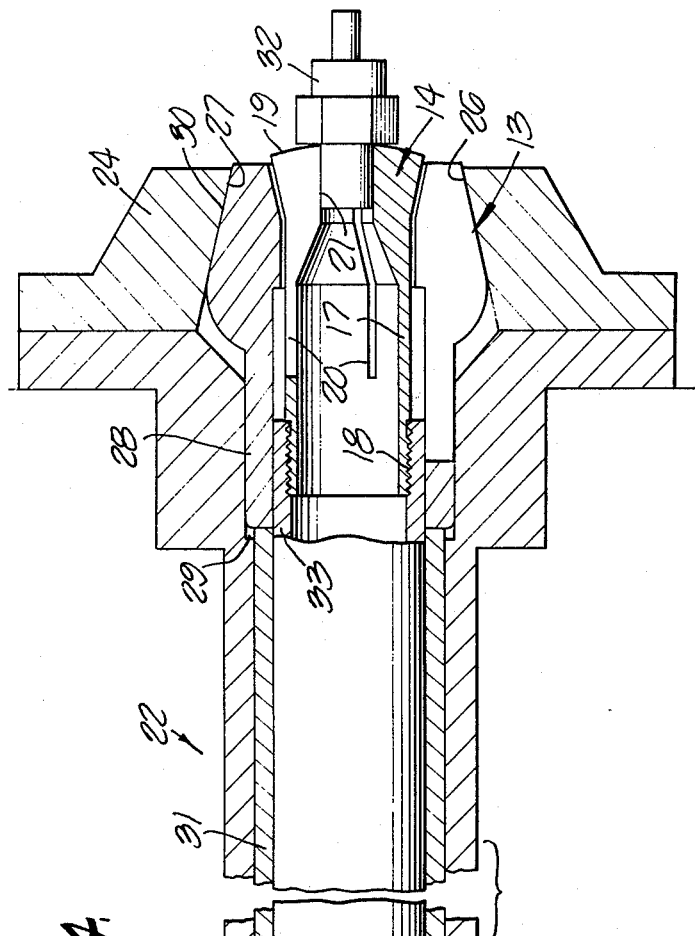
FIG. 4 is an elevational, sectional, partially fragmentary view of the adapter of this invention shown in place in a machine with a workpiece secured therein.

On comparing FIGS. 3 and 4, for example, it is seen that the workpiece collet 14 is a hollow tubular member having an elongate uniformly circular portion 17, one end of which is threaded as at 18. The other, or workpiece holding, end of the collet 14 includes an enlarged head 19 with a smoothly tapered outer periphery. As seen best in FIGS. 2 and 3, the collet walls have three longitudinally extending slots 20 located at 120° from one another, thereby providing a measure of springlike adjustment for the collet bore 21, within which the workpiece is received.

With reference now to FIG. 4, there is shown there a spindle 22 including an elongate, hollow tubular portion 23 at the front end of which is located the spindle nose 24 (means 11, generally) and at the rear end of which there is a plate 25 affixed thereto. The spindle nose 24 is hollow and opens outwardly as at 26, via sloping or tapered walls 27.

In a general purpose chucking arrangement with which we are concerned here, the spindle nose 24 includes the master collet 13, the latter comprising a hollow, uniformly cylindrical portion 28 slidably received within a similarly dimensioned opening 29 in the spindle nose. The outer end of the master collet is an enlarged head having outer tapering walls 30 which intimately contact the tapering walls 27. The interior of the master collet head portion is shaped to closely conform with the tapered end of the workpiece collet 14. Longitudinally extending slots provide springlike resilience and radial adjustability as in the workpiece collet.

Figure 5:
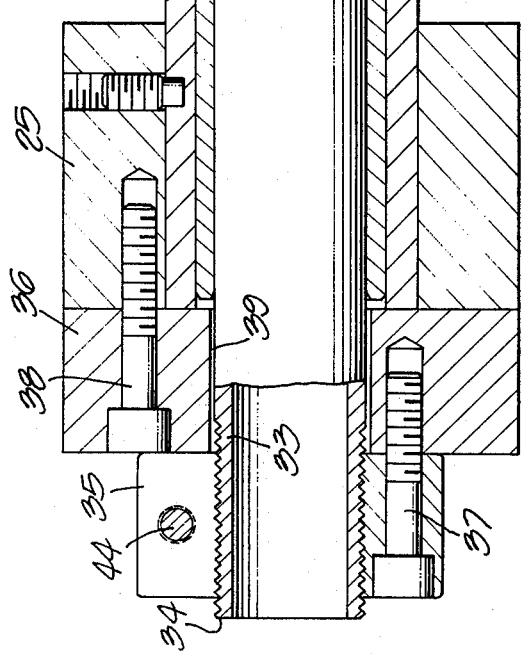
FIG.5 is a sectional, elevational, partially fragmentary view of the machine chucking means showing axial translation of the workpiece achieved in a prior art machine upon closing of the master collet about the workpiece.

As to operation of the master collet 13, a hollow push tube 31, slidably received within 23, has one end that abuts against the inner end of collet 13 and its other end drivingly connected via linkage 16 to lever arm 15. At one extreme of the lever arm adjustment, the master collet is in retracted position as shown in FIG. 4, with its outer opening at maximum extension. Movement of the lever arm to its other extreme, moves the push tube 31 to the right as shown in FIG. 5, which at the same time moves the master collet outwardly of the spindle nose slightly (dashed line) effecting closure of the master collet bore through cooperative engagement of the tapered wall surfaces 27 and 30 (FIG. 4). As seen best in FIG. 5, on merely placing a workpiece or workpiece collet and workpiece directly into the master collet, the workpiece would be subject to an axial translation (dashed line depiction) during tightening. This axial extension in many cases is beyond acceptable tolerances requiring further adjustment before initiating additional machining operations.

Turning now to the detailed aspects of the subject invention, reference is made particularly to FIGS. 3 and 4. As shown there, the workpiece 32 is received within the workpiece collet 14 and the collet disposed within the master collet. An elongated tension tube 33 is passed through the spindle (within 23) and threaded onto the inner end 18 of the collet 14. The other end 34 of the tension tube extends outwardly of the plate 25. A lock nut 35, threaded onto the tension tube end 34 abuts directly (or via a spacer to be described) against the plate 25, positively positioning the workpiece and workpiece collet at the desired predetermined axial location with respect to the machine. Bolt 37 secures the lock nut 35 to spacer 36 and a further bolt 38 interconnects the spacer and plate 25. Accordingly, the tube 33, nut 35 and spacer rotate with the plate and spindle assembly, including the master collet.

Figure 6:
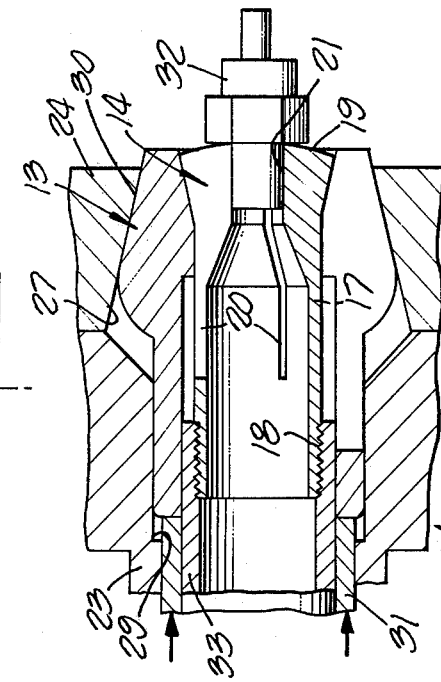
FIG. 6 shows a view similar to FIG. 5 where the workpiece and workpiece collet are maintained against axial translation through the adapter of this invention.

Now on transferring the lever arm 15 to the locking or retention position, the master collet is axially shifted in the manner already described, causing it to clamp down onto the workpiece collet and included workpiece. However, since the workpiece collet 14 is maintained in a fixed axial relation to the machine by the cooperative action of the tension tube 33 and lock nut 35, the workpiece maintains its prescribed initial location. Comparison of FIGS. 4 and 6 shows that what occurs during tightening of the master collet when using the adapter described herein, is that initially the outer end face of the master collet is just inward of the workpiece collet end and on clamping securement, the master collet moves axially with respect to the workpiece collet to extend slightly beyond it (FIG. 6). Reference is now made to FIGS. 1, 3 and 4. As best shown in FIG. 3, the spacer 36 is provided having a control opening 39 of sufficient dimensions to permit sliding receipt onto the end of the tension tube 33. The spacer provides a firm seat against which the nut 35 may be tightened, and, by virtue of the extensive peripheral slots 40 and 41, provides access for arms 42 and 43 to the ends of the push tube 31 on appropriate actuation of lever arm 15.

It is to be noted that the nut 35 is split and includes a lock bolt 44 for locking the nut to the tension tube. That is, initially the nut 35 is adjusted to axially locate the workpiece collet and included workpiece at that position where it will properly be gripped by the master collet upon transfer of the push tube 31.

There is provided in accordance with the practice of this invention adapter apparatus enabling use of workpiece holding collets of considerable variety in a general purpose turret lathe having a single master collet. Moreover, the adapter maintains the work holding collet gripped by the master collet jaws in fixed predetermined axial location. In this manner the work or workpiece can be precisely located initially and subsequent gripping or securing movement of the master collet does not disturb the workpiece axial location. Still further, for effecting other operations such as milling, for example, the workpiece may be left in the same collet and transferred to a jig or fixture for milling.

Still further, by the practice of this invention, a general purpose machine tool has its capability for utilizing collets of a wide range of sizes and functions, (e.g., 5-C collets), substantially and all without having to modify the closure apparatus of the machine tool. That is, the machine tool is not impaired in any way for other operations since the described adapter aparatus is connected and disconnected without disturbing the basic machine tool operation.

What is claimed is:

1. A machine tool collet chucking arrangement which maintains a workpiece at a predetermined location throughout securement therein, comprising:
    a first tapered collet with springlike walls defining an opening therein rotatably mounted in said machine tool;
    means for axially shifting said first collet against fixed parts of the machine tool to close said collet opening;
    a second tapered collet with springlike walls defining a workpiece receiving opening, said second collet being removably received within the first collet opening; and
    means securing said second collet to the machine tool whereby on closing said first collet opening about said second collet and included workpiece no axial movement thereof is produced.

2. A machine tool collet chucking arrangement as in claim 1, in which said securing means includes a member having first parts threaded onto said second collet and other parts removably secured to said machine tool.

3. A machine tool collet chucking arrangement as in claim 1, in which said securing means includes a hollow tube, one end of which is threaded onto said second collet and the other end is removably related to said machine tool by a lock nut threaded thereon.

4. A machine tool collet chucking arrangement for use with such a machine tool having a rotatable hollow spindle, comprising:
   a master collet with deformable walls defining an opening mounted for rotation with said spindle;
   means for selectively shifting said master collet against parts of said spindle to close said deformable walls opening;
   a further collet removably received within said master collet opening and an outer end including deformable walls defining a work holding opening and an inner threaded end; and
   means threaded onto the further collet inner end and secured to the spindle for maintaining said further collet against translation relative to said spindle.

5. A machine tool collet arrangement as in claim 4, in which said means threaded onto said further collet includes a tube, both ends of which are threaded, one threaded end being mated to the further collet and a nut being received on said other threaded end for fixedly securing said tube to the spindle.

6. A machine tool collet arrangement as in claim 5, in which there is further provided spacer means received on said tube between the nut and spindle.

* * * * *